July 28, 1964    R. L. WOERHEIDE, JR    3,142,358
KIT FOR AUXILIARY LUBRICATION SYSTEM FOR AN ENGINE
Filed Aug. 20, 1962    5 Sheets-Sheet 2

INVENTOR.
RAYMOND L. WOERHEIDE, JR.
BY
Sutherland Polster + Taylor
ATTORNEYS

INVENTOR.
RAYMOND L. WOERHEIDE, JR.
BY
Sutherland Polster + Taylor
ATTORNEYS

INVENTOR.
RAYMOND L. WOERHEIDE, JR.
BY
Sutherland Polster & Taylor
ATTORNEYS

INVENTOR.
RAYMOND L. WOERHEIDE, JR.
BY
Sutherland Polster + Taylor
ATTORNEYS

United States Patent Office 3,142,358
Patented July 28, 1964

1

3,142,358
KIT FOR AUXILIARY LUBRICATION SYSTEM
FOR AN ENGINE
Raymond L. Woerheide, Jr., Bridgeton, Mo., assignor to
Champ-Items, Inc., St. Louis, Mo., a corporation of
Missouri
Filed Aug. 20, 1962, Ser. No. 218,047
6 Claims. (Cl. 184—6)

This invention relates to auxiliary lubrication systems for overhead valve engines of motor vehicles and more particularly to kits containing parts to install an auxiliary lubricating system on a motor vehicle engine, which parts are so constructed that they may be used in kits for several different sizes and makes of engines.

In an overhead valve engine, most of the valve operating gear is located on the cylinder head of the engine. Like any other engine mechanism, it requires good lubrication in order to avoid excessive wear and if it is to function smoothly and quietly. Most overhead valve engines, now produced in this country and in others, have the cam shaft located in the cylinder block remote from the cylinder head and the cam motion is transmitted through a valve gear which includes a cam follower, or tappet, riding the surface of the cam. As the cam tappet reciprocates in its guide, it in turn actuates one end of a long push rod projecting through the cylinder head. The opposite end of the push rod engages one end of a rocker arm causing it to oscillate on a stationary rocker shaft mounted in stationary supports spaced along the top of the head. The opposite end of the rocker arm, in turn, pushes downwardly on the stem of an engine poppet type valve causing the valve to open and admit a charge to the cylinder, or, open and exhaust the burned charge. Its particular function in this respect depends upon whether it is an exhaust or intake valve. In either case, the valve is closed by a valve spring biased between a surface on the cylinder head which is stationary and a connection with the movable projecting end of the valve stem.

The valve gear, just described, has a lubrication system. Since the engine oil pump is in the oil sump, usually found in the crank case, this system includes a plurality of connecting passages from the pump through the cylinder block, the cylinder head, one of the stationary rocker arm shaft supports, and into the rocker arm shaft itself which is constructed hollow from end to end. From the interior of the hollow rocker arm shaft, passages lead to the outer surface of the shaft at positions upon which each rocker arm oscillates. Still further oil passages may extend through the rocker arm itself to the bearing parts thereon contacting with the push rod at one end of the rocker arm and the valve stem at the other. The oil after it leaves these bearings is collected in channels in the top of the cylinder head and conducted to passages which drain the oil back to the sump in the crank case of the engine. Most engines also include an overflow tube connected with an oil passage in a rocker arm shaft support. This passage registers with a metered hole and with the oil passage formed by the hollow rocker arm shaft itself. This tube in turn discharges to a special passage leading to drive gearing on the cam shaft. In a V-eight engine, not only is the described valve gear duplicated on each head, but there are usually two of these overflow tubes, one communicating with each of the rocker arm shafts on each of the heads. For example, on one popular make of V-eight engine, the tube on the cylinder head on the right cylinder bank is located at the rear and supplies oil to lubricate the drive gearing between the cam shaft and the distributor shaft. There is also an overflow tube on the cylinder head on the left engine bank which feeds oil to lubricate the drive gearing between the engine crank shaft and the cam shaft.

2

The kit, according to this invention, is adapted for installation in such a manner that all the points indicated will receive an oil supply no matter where oil stoppage occurs in the original lubricating passages. Partial, or almost total, lubrication failure can, and often does, occur due to the collection of sludge in oil passages and this results in wear at any one of the numerous locations in the gear mentioned. This is usually indicated first by a noisy valve gear.

Applicant is aware of the fact that the kits are now on the market which provide, when installed, an auxiliary lubricating system for an engine. The disadvantage of some of these kits is that in order to obtain ease of installation, instructions for installation call for an oil supply connection which ordinarily feed oil to the overflow tubes. Consequently, the function of this essential element of the lubricating system forming the original equipment is eliminated and the drive parts normally lubricated by the overflow tube, or tubes, are left without direct supply of oil. In other words, prior kits do only part of the job to be done.

It is one of the objects of this invention to provide a kit with parts which, when installed according to instructions, will provide an auxiliary lubricating system for the valve gear train of an engine.

It is still another object of this invention to provide a kit with parts which, when installed according to instructions, will provide an auxiliary lubricating system which is a complete substitute for the original system on the engine no matter where partial, or total, flow stoppage may occur in the original system.

It is still another object of this invention to provide a plurality of parts adapted for use in kits of this kind which parts will function satisfactorily in kits for more than one make or size of engine.

Other objects and advantages of this invention will appear from the following detailed description which is in such clear, concise and exact terms as will enable any person skilled in the art to make and use the same when taken in conjunction with the accompanying drawings, forming a part thereof, and in which.

Figures 1, 2, 3, 4, 4A, 5:
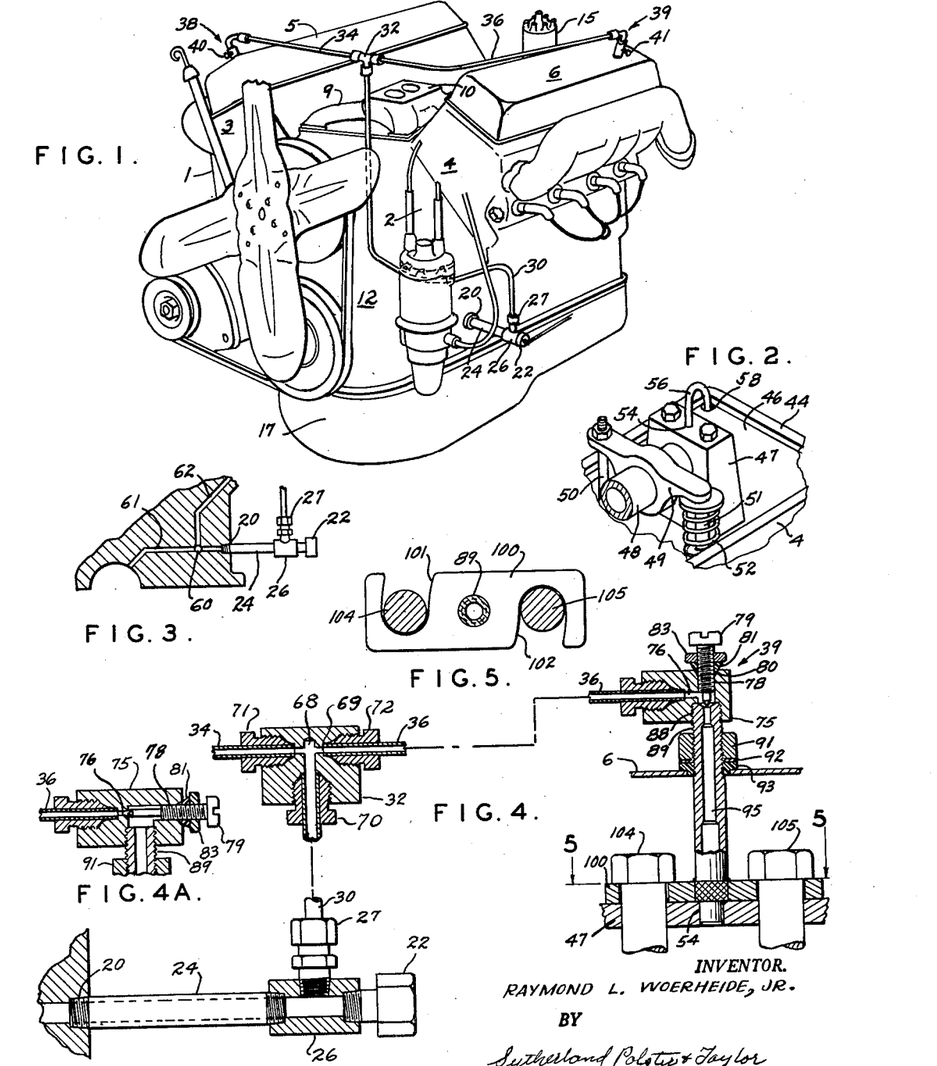
FIG. 1 is an environmental view in perspective illustrating a kit according to this invention installed on a V-eight type of engine.
FIG. 2 is a fragmentary view in perspective of a small portion of the top of one head of an engine such as shown in FIG. 1 with the valve cover removed.
FIG. 3 is a fragmentary stectional view through an engine showing the installation of the parts of the kit to connect with a source of oil under pressure.
FIG. 4 is a schematic view with parts in section illustrating in detail the manner of interconnecting the parts of the kit for an installation of the kind shown in FIG. 1.
FIG. 4A shows a modified form for one of the kit parts.
FIG. 5 is a section taken on the line 5—5 of FIG. 4.

Turning now to the drawings, FIG. 1 can be taken as illustrative of a common form of V-eight engine now manufactured in this country for motor vehicles. Certain parts of the engine have been omitted for clarity. In FIG. 1 is shown a V-eight type of engine with a left cylinder bank 1 and a right cylinder bank 2 formed as an integral engine block casting. On the left bank 1 is a removable cylinder head 3 and on the right bank 2 is the removable cylinder head 4. Secured to the upper surface of the cylinder head 3 is a valve cover 5 which encloses a part of the valve gear on top of the head. On the right cylinder head 4 is a valve cover 6 also enclosing a part of the valve gear for the cylinders in this bank of the engine.

The engine is also provided with the usual intake manifolds 9 provided with a pad 10 to which the carburetor is secured. The carburetor feeds mixture into the separate legs of the manifold and the mixture is distributed to all the cylinders, four in each bank, by intake manifold 9. On the front of the engine block is a timing gear casing 12 enclosing the drive gearing for a cam shaft from the crank shaft of the engine. The cam shaft is mounted between the banks of the two rows of cylinders in the engine block and extends from front to rear, all in a well known manner. At the rear of the engine is a distributor 15 which is driven from the drive gearing at the rear end of the cam shaft. The engine structure, so far described, is fully conventional and a detailed description does not appear to be necessary for a clear understanding of this invention.

As heretofore stated, most engines are provided with an oil sump usually located in a pan 17 forming the detachable portion of the crank case of the engine. Furthermore, the sump contains the supply for an oil pump driven by the engine and supplying the multitude of oil galleries which are formed in the engine block and cylinder heads. There is an opening 20 which communicates with the main oil gallery from the pump and screwed into this opening 20 is usually what is termed a "sender" which is merely an oil pressure operated switch closed when there is no pressure delivery from the pump and opened by the presence of normal oil pressure in the galleries. This switch in turn is connected in a circuit with a signal light on the instrument panel of the motor vehicle. With the ignition switch on, and the engine stopped, the sender is closed indicating no oil pressure by lighting a signal lamp. On the other hand with the ignition on and the engine running, normal oil pressure in the galleries opens the switch in the sender and the signal light is off.

To install the kit according to this invention, the sender 22 is removed from the tapped hole 20 communicating with the main oil gallery of the engine. The kit contains the following described parts installed in the manner illustrated in FIG. 1. After the sender 22 is removed, a nipple 24, threaded at both ends, is screwed into the tapped hole 20. The T 26 is threaded on the end of the nipple 24 and the other outlet of the T receives the sender 22. T 26 is provided with a union connection 27 which forms a liquid tight joint when made up on the end of main supply tube 30. The tube 30 extends along the side of the engine and up the front thereof to a T 32. The T 32 is equipped with three couplings, one for the line 30 and one each for the branch lines 34 and 36. Branch 34 is connected with an assembly 38 mounted on the valve cover 5. The assembly 38 includes a connection extending through the valve cover to a rocker arm shaft support in a manner hereinafter described. On the asembly 38 is a metering screw 40 for controlling the rate of flow through branch 34. Branch 36 is also connected with an assembly 39 on the valve cover 6. This assembly includes a connection through the valve cover to a stationary rocker arm shaft support. A metering screw 41 is provided in the assembly 39 to control the flow of oil through the branch 36.

FIGURE 2 illustrates a portion of a cylinder head, such as shown in FIG. 1, with the valve cover removed. FIG. 2 can be taken as illustrative of either the engine construction at the rear of the cylinder head 4 or the front of the cylinder head 3. These two portions of the separate heads would appear substantially the same except the parts would be reversed. Thus in FIG. 2, the cylinder head 4 is surrounded by a flange 44 which is relatively flat and receives the valve cover 6. There is a flange at the margin of the valve cover 6 which is in face to face relation with the flange 44. Within the flange 44 is a shallow sump 46 on the top surface of the cylinder head 4. Oil from the valve gear drains into the sump 46 and is thence conveyed through passages, not shown, back to the crank case of the engine. Bolted to the upper surface of the cylinder head 4 are a plurality of spaced rocker arm shaft supports 47, one of which is shown in FIG. 2. A hollow rocker arm shaft 48 is held stationary in these supports. There may be as many as four of these supports spaced along the hollow rocker arm shaft 48 from one end of the head 4 to the other. A plurality of rocker arms 49 operated by push rods 50, one of which is shown, operates the valve in the overhead valve engine. One of the valve stems 51 is shown in FIG. 2. This stem 51 is surrounded by a valve spring 52 which returns the valve to closed position. Oil is fed to the hollow rocker arm shaft 48 through passages extending through one of these supports 47. Usually one of the intermediate supports is midway the length of the hollow rocker arm shaft 48. Oil flows through the shaft 48 to drilled passages communicating with the outer surface of the shaft at the position of each rocker arm 49, all as heretofore described. The rear rocker arm shaft support 47 in the right bank of cylinders and the corresponding support at the front end of the left band of cylinders each have openings, such as 54 shown in FIG. 2, communicating directly with the interior of the hollow rocker arm shaft 48. These openings 54 have overflow tubes, such as 56, connected with an opening 58 which is the upper end of a passage extending down through the cylinder head and the engine block to gearing on the cam shaft. The passage described at the rear of the right cylinder head extends to the gearing on the cam shaft driving the distributor 15. The corresponding opening in the front of the left cylinder head has a similar tube and a similar opening to a passage extending down through the left cylinder head and the left side of the engine block to lubricate the drive gears between the cam shaft and the crank shaft which are contained within the housing 12.

In applying the kit according to this invention, these overflow tubes on both the right and left cylinder banks are removed, and assemblies 39 and 38, respectively, are connected with the openings, such as 54 shown in FIG. 2. This provides an auxiliary oil supply through the installed system directly to the hollow rocker arm supporting shafts on both cylinder heads. This auxiliary supply of oil will supplement any oil coming through the regular engine passages to the hollow rocker arm support shafts. The amount of oil supplied can be regulated by the metering screws 40 and 41 so that an adequate supply of oil is available. In addition, the kit, when installed, makes provision for the lubrication normally supplied through overflow tubes, all in a manner hereinafter described.

Turning now to FIG. 3, herein is shown a typical section through the front crank shaft bearing in the engine block illustrating the arrangement of oil galleries. Main gallery 60, for example, is supplied directly by the oil pump and this gallery has a plurality of interconnected passageways 61 and 62. Passage 61 is one of the passages leading to a crank shaft bearing which branches off the main gallery 60. Passage 62 is one of the passages which leads upwardly through the engine block and head and finally connects with the hollow rocker arm shaft through passages in the stationary supports, above described. The threaded opening 20 is provided for the sender 22 which forms a plug preventing the escape of oil. When the kit is installed, sender 22 is mounted in T fitting 26, where it operates in the same way as above described to indicate the lack of oil pressure when the ignition switch is on.

FIG. 4 illustrates schematically the position of the several parts of the kit and details of the construction of assemblies 38 and 39, heretofore mentioned. Only one of the assemblies will be described because both are the same. In FIG. 4, the installation is as above described with respect to FIG. 1, and the parts are shown enlarged and more in detail. As will be seen from this view, nipple 24 is a conventional threaded nipple secured by its threads in the hole 20 of the engine and at its opposite end in the T fitting 26. This T 26 is a hexagonal piece of stock threaded at its opposite ends for the nipple 24 and the sender 22. A union 27 secures the main supply tube 30 which in turn extends to the T block 32. In the T block 32 are a pair of intersecting passageways 68 and 69 which extend from threaded openings in the block 32. Each of the three threaded openings are identical and are formed in counterbores concentric with the passages 68 and 69. Unions 70, 71 and 72, all are threaded into these counterbores so as to clamp the main supply tube 30 and each of the branches 34 and 36 securely in place in the block 32. The inner face of the counterbores are tapered so as to produce the clamping action on each of the lines 30, 34 and 36. The opposite ends of lines 34 and 36 are similarly secured in the assemblies 38 and 39. Only one of these will be described in detail, since both are identical.

The assembly 39 can be constructed as shown in FIG. 4 or 4A. In both, it has a metering block 75 with internal passages 76 with which the line 36 is connected by way of a suitable coupling screwed into the metering block 75. Adjacent to the passage 76 is a threaded opening 78 for the metering screw 79. The opening in the metering block formed by the threaded passage 78 has a tapered seat 80, and a wedge-shaped, or tapered, ferrule 81 preferably of nylon, or some other deformable material, is wedged against the tapered seat 80 by a nut 83 threaded on screw 79. This arrangement provides a lock for holding the metering screw 79 fixed, once it is properly set. In addition, the ferrule 81 forms a convenient seal which, when the nut 83 is made up tight, causes the material in the ferrule to wedge into the threads of the screw 79 to prevent leakage through the threads. Assembly 39 has a second threaded opening 88 adjacent the end of the metering screw 79 into which the threaded end of a vertical stem 89 is secured. A tapered seat cooperates with the beveled end on the metering screw 79. On the threaded portion of the stem 89 is a nut 91 and under the nut 91 is a metal washer 92 and a ferrule 93 of rubber-like material. The valve cover 6, for example, is provided with a hole to receive the bushing part of the ferrule 93 which is clamped in place tightly against the upper surface of the valve cover 6 by the nut 91. There is a passage 95 extending downwardly to the lower end of the stem which lower end is fastened into the hole 54 in the top of a stationary rocker arm shaft support 47, all as heretofore described. The stem 89 has a knurled portion and cast upon this knurled portion in a bracket 100 shown in plan in FIG. 5. Opposite ends of the bracket 100 have slots 101 and 102 opening in a direction so that the bracket may be inserted between the studs 104 and 105 after they have been unthreaded and then twisted so that the slots 101 and 102 are inserted beneath the heads of the studs 104 and 105. When the studs are tightened, the bracket 100 is secured in place holding the end of the stem 89 in the hole 54. The above described parts form the basic elements in the novel kit. These basic elements may be modified as to form as hereinafter described. Also other elements may be added to these basic elements to adapt the kit for use on different types of engines.

Figures 6, 7:
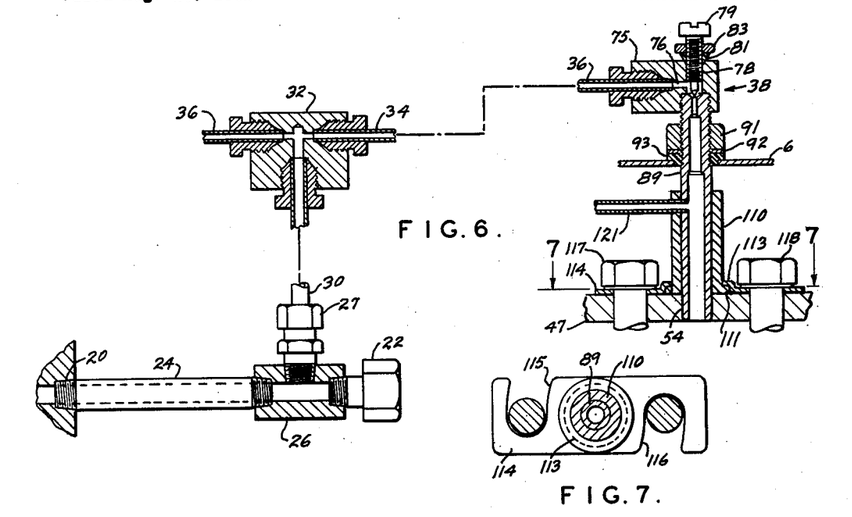
FIG. 6 is a fragmentary schematic view with parts in section illustrating in detail the manner of interconnecting parts of a modified form in a kit for an installation of the kind shown in FIG. 1.
FIG. 7 is a section taken on the line 7—7 of FIG. 6.

FIGS. 6 and 7 show certain modifications and additions to the kit elements described heretofore. This description will be limited to the differences between and the additions to the kit shown in FIG. 4 and FIG. 5. Turning now to FIGS. 6 and 7, the stem 89 in this modification is surrounded by a bushing 110 flanged as at 111. Stem 89 has a press fit with the bushing 110. Flange 111 in turn is received in a socket 113 in a sheet metal clip 114. This clip in turn is provided with a pair of oppositely facing slots 115 and 116 to accommodate the stem of studs 117 and 118. The studs can be loosened slightly, the stem 89 inserted in the hole 54 and then the clip 114 rotated to slide the slots 115 and 116 under the heads of the studs 117 and 118. The studs are then tightened holding the clip and stem in place. The side of the bushing 110 is apertured at 120 to receive a tube 121. This tube replaces the tube 56 described in FIG. 2 and connects with the passage in the cyilnder head provided for the lubrication of drive gearing on the cam shaft of the engine. The particular engine may have one or two of these passages, as aforementioned. One located at the rear of the right bank and one located at the front of the left bank. If there are one or more of these passages, then the modification shown in FIG. 6 is particularly adaptable. If there is one, then the kit includes an assembly, such as 38 in FIG. 6, and an assembly, such as 39, in FIG. 4. If there are two such passages, then both assemblies would be alike and constructed in a manner such as the assembly 38 in FIG. 6.

Figure 8:
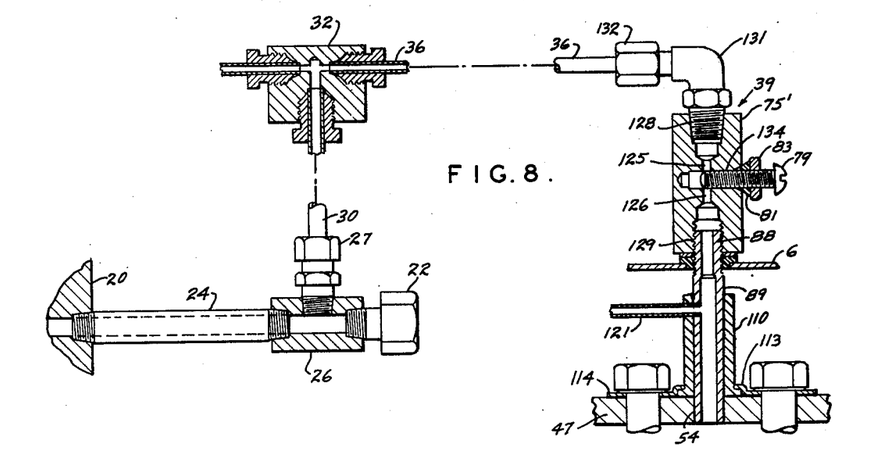
FIG. 8 is a schematic view with parts in section illustrating in detail the manner of interconnecting parts of a modified form in a kit for an installation of the kind shown in FIG. 1.

The modification shown in FIG. 8 is constructed in a manner very similar to that shown and described in FIG. 6. The difference between the two modifications resides in the construction of the metering block. Whereas the metering block in FIG. 6 is identical with that shown as 75 in FIG. 4, this metering block can have different forms. Another of these forms is shown in FIG. 8. According to this modification, the metering block 75' is a hexagonal nut-like device with aligned metering passages 125 and 126. These passages are counterbored at opposite ends of the nuts to form threaded sockets 128 and 129. Threaded socket 128 receives an elbow 131 provided at its opposite end with a coupling 132 to connect with line 36, for example. Threaded socket 129 connects with the threaded end 88 of the stem 89. Consequently, the metering block 75' performs not only the function of metering, as will be hereinafter described, but also the function of securing the rocker valve cover 6 in place. A tapped hole 134 intersects the passages 125 and 126. This tapped hole in turn receives a metering screw, such as 79 heretofore described. On the metering screw is a threaded nut 83 and a nylon ferrule 81, such as shown and described in FIG. 4.

Figure 9:
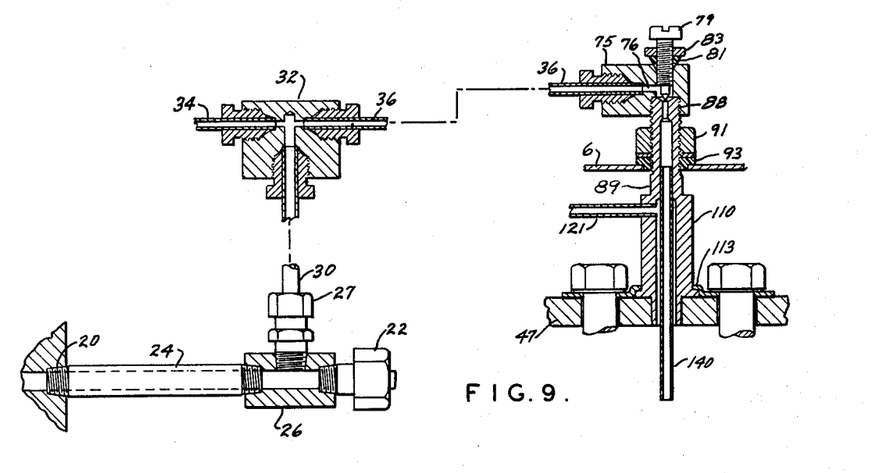
FIG. 9 is a schematic view with parts in section illustrating in detail the manner of interconnecting parts of a modified form in a kit for an installation of the kind shown in FIG. 1.

The modification shown in FIG. 9 is substantially the same as that shown in FIG. 6. In this modified form shown in FIG. 9, the stem 89 receives a tube 140 which has a press fit in the stem adjacent the threads 88. The remaining portion of the stem from the location of the tube 121 is in spaced relation with the outside of the tube 140 forming a return passage for oil around the tube 140 through the stem 89 to the tube 121. In the modification, the tube 140 projects downwardly through the stationary rocker shaft support and into the hollow interior of the rocker shaft itself. The pressure of oil in the hollow rocker shaft passes upwardly through the stem 89 around the outside of the tube 140 and flows through the tube 121.

Figure 10:
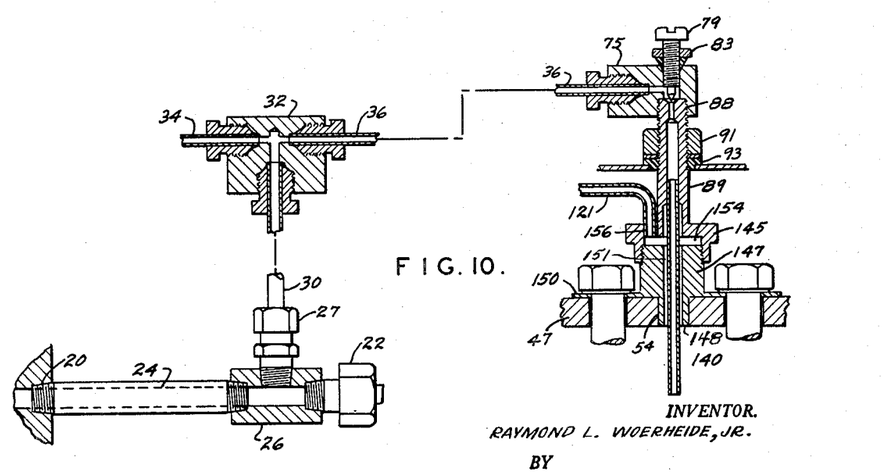
FIG. 10 is a schematic view with parts in section illustrating in detail the manner of interconnecting parts of still another modified form for a kit for installation on the engine, such as shown in FIG. 1.

The modification shown in FIG. 10 is very similar to that shown in FIG. 9 and operates in the same manner. In this modification, the stem 89 has a threaded socket 145 and contains a tube 140 held therein by a press fit. This tube projects downwardly to within the hollow rocker arm shaft as aforedescribed. The threaded socket 145 on the end of stem 89 engages threads on the exterior of a bushing 147 which has a tubular extension 148 projecting into the hole 54. This bushing 147 has integrally formed thereon a clip 150 with slotted ears to slip under the heads of the studs on the stationary rocker shaft support. Bushing 147 has a central passage 151 surrounding the tube 140 in spaced relation so as to form a part of an overflow passage surrounding the tube 140 and leading to the space 154 in the threaded socket 145. The top of this threaded socket 145 is apertured at 156 to receive a tube 121, such as heretofore described, which will convey the overflow to the passage in the head of the engine.

Figure 11:
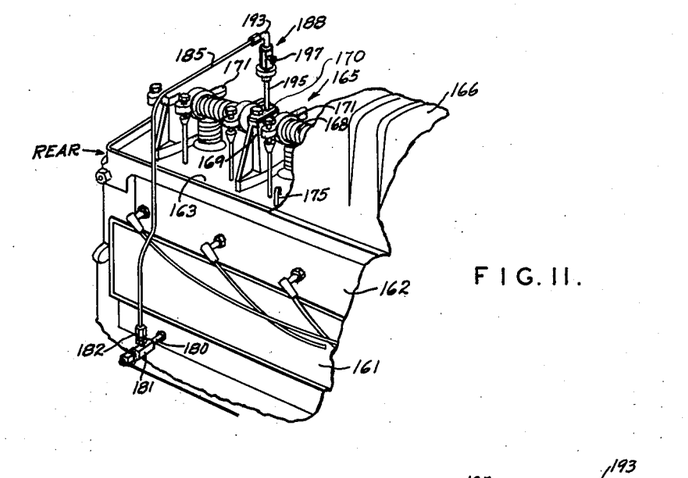
FIG. 11 is a view similar to FIG. 1 illustrating the manner of interconnecting the same parts in another kit for installation on another type of engine.

The parts herein described in detail have more than one application to more than one kind of engine. As will be readily recognized, the engine shown in part in FIG. 11 is an in-line six cylinder type rather than a V-eight type. It is still an overhead valve type of engine, however, and the construction of its valve gear will be readily apparent to one skilled in the art from an inspection of FIG. 11. According to this view, the engine, therein shown, has an engine block 161 with a removable head 162 containing a well 163 to trap the oil draining from the valve gear 165. The gear 165 is conventional although here shown with some of the parts eliminated to facilitate a clearer understanding of this invention. Well 163 and the valve gear 165 are enclosed by a cover 166 in the usual manner. The hollow rocker arm shaft is indicated as 168 supported in the stationary rocker shaft supports 169, one of which has an opening 170. The hollow rocker arm shaft 168 is supplied with oil through the opening 170 to lubricate the rocker arms 171 on the shaft 168. The engine is normally equipped with an oil supply tube 175 which extends to the opening 170 in the stationary shaft support 169. When this tube 175 fails to supply sufficient oil to keep the valve gear quiet and properly lubricated, the kit, according to this invention, is installed. The first step in installing the kit is to cut off the tube 175 and bend it upon itself, crimping the end so as to stop the flow of oil. The second step is to install a kit, according to this invention, to supply oil to the opening 170. As will appear from the following description, this kit contains kit elements similar in some instances and identical in others with the kit elements heretofore described.

Figure 12:
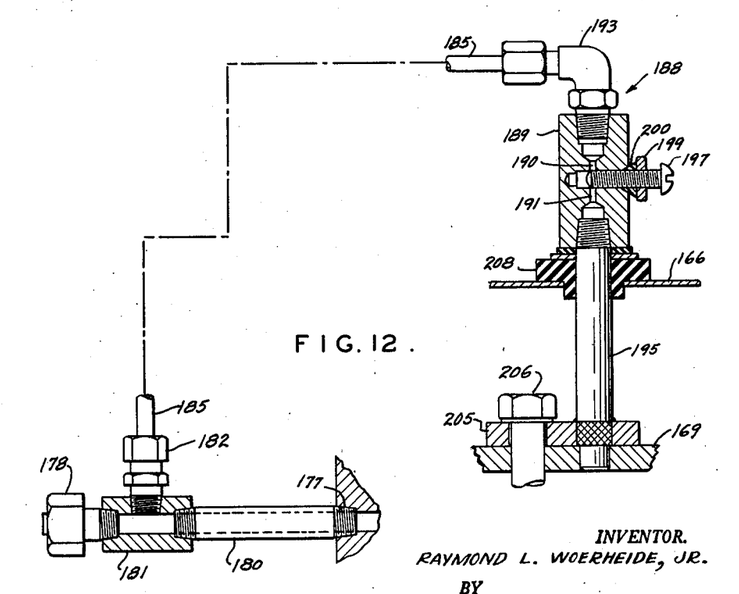
FIG. 12 is a schematic view with parts in section illustrating in detail the manner of interconnecting parts such as those in FIGS. 4 and 8 to form a kit suitable for installation on the engine shown in FIG. 11.

The engine block of the engine shown in FIGS. 11 and 12 is originally equipped with a tapped hole 177 for an oil "sender" 178. To install the kit according to this invention, the sender 178 is removed and a nipple 180 threaded into the hole 177. On the end of the nipple is a T fitting 181 and this accommodates the sender 178. The change in position of the sender has no effect upon its operation. On the T 181 is a coupling 182 for connecting the main supply tube 185. This main supply tube 185 in turn connects with an assembly similar to the assemblies 38 and 39 heretofore described and here indicated as 188. The construction of the assembly 188 is better shown in FIG. 12. In this assembly is a metering block exactly like that heretofore described in FIGS. 4 and 8. This metering block 189 is a hexagonal nut provided with central passages 190 and 191. The end of these passages terminate in threaded counterbores which receive elbow 193 and stem 195. There is a metering screw 197 threaded in a passage intersecting the passages 190 and 191. On the metering screw 197 is a nut 199 and the nut 199 may be tightened against a nylon ferrule 200, the same as heretofore described in FIG. 8. The lower end of the stem 195 is anchored in a bracket casting 205 which in turn is slotted to be received under the head of the stud 206 in the stationary support for the rocker arm shaft. Thus, it will be readily recognized that similar kit elements to those shown in FIGS. 4 and 8 can be used in the kit shown in FIG. 12 by plugging tube 121 or removing this tube and plugging the hole for the tube 121.

Figure 13:
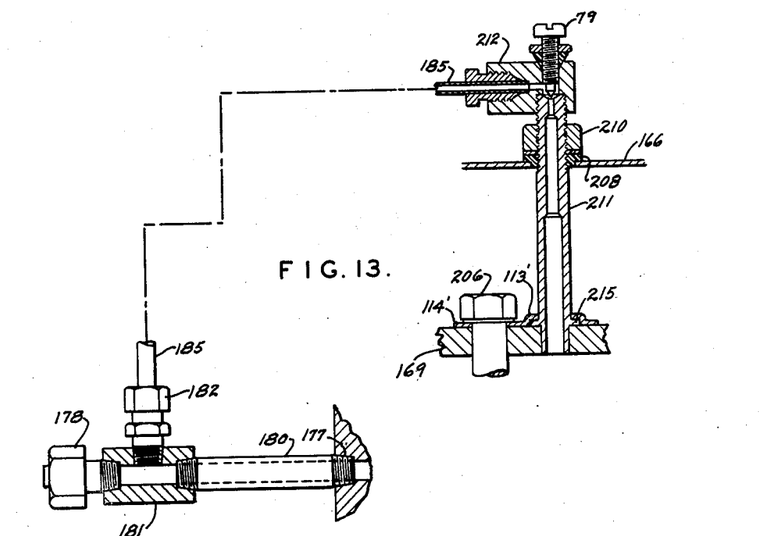
FIG. 13 is a schematic view with parts in section illustrating in detail the manner of interconnecting still other modified forms of parts similar to those shown in FIG. 6 which form a kit suitable for installation on the engine shown in FIG. 11.

The kit shown in FIG. 13 is interchangeable in many instances with that shown in FIG. 12. Both can be used on the engine shown in FIG. 11. The difference between these kits is that in the kit shown in FIG. 13 the metering block 212 is the same as that heretofore described in the kits shown in FIGS. 4, 6, 9 and 10. The stem 211 in this modification is provided with a flange 215 which is held in the socket of a sheet metal clip, the same as that described in FIG. 7.

Figure 14:
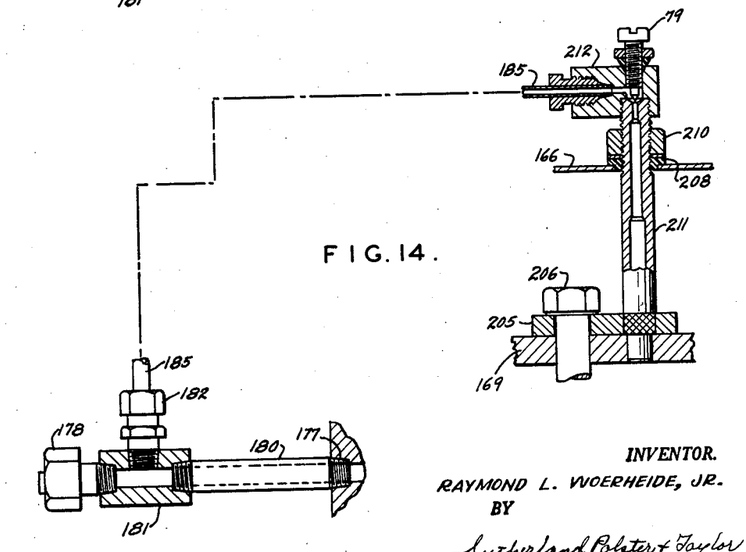
FIG. 14 is a schematic view with parts in section illustrating in detail the manner of interconnecting still other modified forms of parts similar to those shown in FIG. 4 to form a kit which is suitable for installation on the engine shown in FIG. 11.

The kit elements shown in FIG. 14 are the same as those heretofore described with respect to FIG. 13 except that in this case the stem 195 is identical with that in FIG. 12 and is supported in fixed position by an identical bracket 205. A comparison between FIGS. 13 and 14 will reveal that the sole difference in kit elements has to do with the bracket, and that this bracket, used in the kit elements of FIG. 14, is identical with that disclosed and described in FIG. 12. The same reference characters are therefore applied.

*Operation*

The installation of any one of the kits heretofore described is accomplished in substantially the same manner and a description of one will serve for all. Thus, this description applies specifically to the V-eight type of engine, and yet it can be followed almost identically in each installation.

In installing a kit, the oil sender unit 22 should be removed from the threaded hole in the side of the engine block and nipple 24, T 26 and sender unit 22 assembled and screwed into this hole. The valve covers 5 and 6 should next be removed by removing the attaching bolts, or studs. Both outlet tubes at the rear of the right blank and the front of the left bank should be removed if there are two of these. The studs in the rear stationary rocker shaft support on the right bank and the studs in the front rocker shaft support on the left bank should then be loosened sufficient so that the stem of an assembly, such as 38 and 39, can be inserted in the oil outlet hole and the bracket 111 be rotated into a position where the slots occupy a position beneath the heads of the studs. Overflow tube 121 should then be inserted into its proper passage opening in the cylinder head, both on the front and rear bank, and the studs on the stationary rocker shaft support tightened to hold the assemblies firmly in place. Lines 34 and 36 are installed connecting the assemblies with the T block 32 and finally line 30 is installed connecting with T 26. The engine should then be started and allowed to run to test for leaks, and, if the system is tight, the metering screws 40 and 41 should then be set to obtain a substantial flow of oil through each of the valve gears. Once the metering screws are set, lock nuts 83 should be tightened clamping the ferrules 81 in position to prevent any leakage. When fully tightened, the ferrules will be compressed because they are deformable so as to fill the interstices between the threads of the metering screws and form a seal both here and with the metering block. During the check of the functioning of the kit with the valve cover removed, the action of the overflow tubes 121 should also be inspected to be sure that adequate oil is being supplied to the passages in which the ends of the tubes are inserted.

After the check for leakage and proper metering has been performed, the kit elements are disassembled partially by disconnecting the lines 34 and 36 from the assemblies 38 and 39. Metering blocks 75 are removed from the stem 95 as well as nuts 91 and ferrules 93, if such are provided in the assembly. The valve covers 5 and 6 are then reinstalled and bolted in place by the use of the studs and by screwing down on the nuts 91, or the metering blocks. When the covers have been reinstalled in this manner, the metering blocks are reassembled with the stems and the lines 34 and 36 interconnected. The engine then should be restarted and a final check made for leaks. All of the exposed connections on the outside of the engine should be inspected and given a final tightening. When installed in this manner, the kits, heretofore described, will assure adequate supply of oil to the valve gear and cam shaft gearing. Furthermore, the supply of oil will be available immediately upon starting the engine. There is no lag in time. The engine, therefore, will run much more quietly and start much more quietly since all parts of the valve gear and cam shaft gearing receive immediate lubrication.

Changes in and modifications of the construction described may be made without departing from the spirit of my invention or sacrificing its advantages.

Having thus described the invention, what is claimed and desired to be secured by Letters Patent is:

1. In an auxiliary oil line kit installation on an overhead valve engine having a valve cover enclosing the valve gear for the overhead valves of the engine and secured to said engine by bolts extending through spaced holes in said cover, and a valve gear including a hollow shaft, supports for said shaft secured to said engine by studs projecting through said supports with the headed ends of said studs at the top of said supports, and an oil passage extending through the top of one of said supports into said hollow shaft from an opening in one support beside one of said studs, the improvement comprising,
    (a) an auxiliary oil line including a stem of a length extending from within said opening and projecting through a hole in said valve cover,
    (b) a means embracing and holding a portion of said stem projecting from said opening including a bracket,
    (c) an end on said bracket projecting beyond one of said studs provided with an open ended slot offset from said stem and shaped to embrace one of said studs when said bracket is pivoted with said stem as a center,
    (d) a threaded upper end on said stem,
    (e) a ferrule slidable onto said threaded end of a size to close the hole around said stem, and
    (f) a metering nut forming a portion of said auxiliary oil line engaging the threaded upper end of said stem to clamp said ferrule in place on said stem.

2. In an auxiliary oil line kit installation on an overhead valve engine having a valve cover enclosing the valve gear for the overhead valves and secured to said engine by bolts through spaced holes in said cover, and a valve gear including a hollow shaft, supports for said shaft secured to the engine by studs projecting through said supports with the headed ends of said studs at the top of said supports, and an oil passage extending through the top of one of said supports into said hollow shaft from an opening in said one support beside one of said studs, the improvement comprising,
    (a) an overhead oil line including a stem of a length extending from within said opening and projecting through a hole in said valve cover,
    (b) a flanged member secured between opposite ends of said stem,
    (c) a centrally apertured metal clip receiving said stem and seated on said flanged member and having a projecting end, and an open ended slot in the end of said clip shaped to slip beneath the head of one of said studs,
    (d) a threaded upper end on said stem,
    (e) a ferrule slidable on said threaded end of a size to close the hole around the stem, and
    (f) a metering nut forming a portion of said auxiliary oil line engaging the threaded upper end of said stem to clamp said ferrule in place on said stem.

3. In an auxiliary oil line kit installation on an overhead valve engine having a valve cover enclosing the valve gear for the overhead valves and secured to said engine by bolts extending through spaced holes in said cover, and a valve gear including a hollow shaft, supports for said shaft secured to said engine by studs projecting through said supports with the headed ends of said studs at the top of said supports, and an oil passage extending through the top of one of said supports into said hollow shaft from an opening in said one support between said studs, the improvement comprising,
    (a) an auxiliary oil line including a stem of a length extending from within said opening and projecting through a hole in said valve cover,
    (b) a flanged member located between opposite ends of said stem,
    (c) a metal clip with projecting ends centrally apertured between said ends receiving said stem and seated on said flanged member and spaced open ended slots in the ends of said clip shaped to slip beneath the heads of said studs,
    (d) a threaded upper end on said stem,
    (e) a ferrule slidable onto said threaded end of a size to close the hole around said stem, and
    (f) a metering nut forming a portion of said auxiliary oil line engaging the threaded upper end of said stem to clamp said ferrule in place on said stem.

4. In an auxiliary oil line kit installation on an overhead valve engine having an engine driven oil pump located in an oil sump in the crank case of the engine, a valve gear including an engine driven cam shaft, drive gearing for said cam shaft, a valve operating gear for the overhead valves of said engine driven by said cam shaft, and a lubricating system including oil supply passages in said engine and in said valve operating gear connected with said pump, and oil return passages to said cam shaft drive gearing and said sump supplied through a return tube extending from an outlet in the oil supply passages in said valve operating gear, the improvement comprising,
    (a) an auxiliary oil line connected at one end with said pump by way of said oil supply passages leading directly from said pump,
    (b) means connecting the other end of said oil line to said oil supply passages in said valve operating gear at the outlet in said oil supply passages in said valve operating gear after said return tube has been removed,
said means including a line connecting with said oil return passages to said cam shaft drive gearing and said sump originally supplied through said return tube before its removal, and
    (c) means to divide the flow of oil from said auxiliary oil line to said valve operating gear, and to said return passages.

5. In an auxiliary oil line kit installation on an overhead valve engine having a valve cover enclosing the valve gear for the overhead valves of the engine and secured to said engine by bolts extending through spaced holes in said cover, and a valve gear including a hollow shaft, supports for said shaft secured to said engine by studs projecting through said supports with the headed ends of said studs at the top of said supports, an oil passage extending through one of said supports into the passage in said hollow shaft, and means in said kit including an auxiliary oil line connected with a source of oil under pressure and to said passage to lubricate said overhead valve gear, the improvement comprising,
    (a) a hollow stem forming part of said means in said kit connected to said auxiliary oil line and, secured to, and extending from one of said supports and projecting through a hole in said valve cover,
    (b) a connection between said hollow stem and said auxiliary oil line outside said valve cover including an oil metering device, (c) means for anchoring said hollow stem in one of said supports, (d) a ferrule held on said hollow stem in a position to close the hole in said valve cover through which said stem projects, (e) bushing means surrounding said hollow stem in spaced relation so as to form a chamber in communication with the passage in said hollow stem, and (f) a tube fixed on said bushing in communication with said chamber and extending laterally from said hollow stem beneath said valve cover.

6. In an auxiliary oil line kit installation on an overhead valve engine having an engine driven oil pump located in an oil sump in the crank case of the engine, a valve gear including an engine driven cam shaft, drive gearing for said cam shaft, a valve operating gear for the overhead valves of said engine driven by said cam shaft and supported by a hollow rocker arm shaft, and a lubricating system including oil supply passages in said engine and in said valve operating gear connected with said pump through said hollow rocker arm shaft, and oil return passages from said valve operating gear to said drive gearing and sump connected to said oil supply passages in said valve operating gear, the improvement comprising, (a) an auxiliary oil line connected at one end to said oil pump by way of said oil supply passage leading directly from said oil pump, (b) means connecting the other end of said oil line with the passage in said hollow rocker arm shaft between the connection of said oil supply passages in said valve operating gear and the connection of said oil return passages to said drive gearing from said hollow rocker arm shaft to provide an auxiliary supply of oil to both said supply passages in said valve operating gear and said return passages from said valve operating gear to said drive gearing and ensure adequate lubrication for said valve operating gear and said drive gearing, and (c) an oil metering device between said auxiliary oil line and said means (b) for controlling the flow of oil to the connection between said oil supply passage in said valve operating gear and said oil return passage to said drive gearing.

References Cited in the file of this patent

UNITED STATES PATENTS

| | | |
|---|---|---|
| 152,844 | Johnston | July 7, 1874 |
| 409,031 | Forniraseo | Aug. 13, 1889 |
| 993,093 | Mueller | May 23, 1911 |
| 3,008,544 | Krizman | Nov. 14, 1961 |
| 3,096,851 | Johnson | July 9, 1963 |